US012611811B2

(12) United States Patent　　　　(10) Patent No.:　US 12,611,811 B2
Soellner et al.　　　　　　　　　　(45) Date of Patent:　Apr. 28, 2026

(54) STERILE BLOW MOLDING MACHINE WITH EJECTION SLUICE AND METHOD FOR THE OPERATION THEREOF

(71) Applicant: KRONES AG, Neutraubling (DE)

(72) Inventors: Juergen Soellner, Beratzhausen (DE);
Norbert Kindl, Tegernheim (DE);
Florian Geltinger, Donaustauf (DE);
Waldemar Suppes, Nittendorf (DE);
Christian Wittmann, Hemau (DE);
Daniel Theen, Lappersdorf (DE);
Florian Gerngross, Regensburg (DE)

(73) Assignee: KRONES AG, Neutraubling (DE)

( * ) Notice: Subject to any disclaimer, the term of this patent is extended or adjusted under 35 U.S.C. 154(b) by 82 days.

(21) Appl. No.: 18/221,297

(22) Filed: Jul. 12, 2023

(65) Prior Publication Data

US 2024/0017469 A1　　　Jan. 18, 2024

(30) Foreign Application Priority Data

Jul. 12, 2022　(DE) ...................... 10 2022 117 359.3

(51) Int. Cl.
B29C 49/42　　　(2006.01)
B29C 49/36　　　(2006.01)
(Continued)

(52) U.S. Cl.
CPC ........ B29C 49/42095 (2022.05); B29C 49/36 (2013.01); B29C 49/46 (2013.01);
(Continued)

(58) Field of Classification Search
CPC ......... B29C 49/46; B29C 49/42; B29C 49/28; B29C 49/12; B29C 49/42095; B29C 49/42065; B29L 2031/712
See application file for complete search history.

(56) References Cited

U.S. PATENT DOCUMENTS 5,792,435 A　　8/1998　Mueller et al. ................ 422/292
2009/0071104 A1　3/2009　Fischer ........................... 53/426
(Continued)

FOREIGN PATENT DOCUMENTS

DE　　102015122025　　6/2017　............. B29C 49/46
DE　　102015122310　　6/2017　............. B29C 49/42
(Continued)

OTHER PUBLICATIONS

Search Report issued in European Patent Appln. Serial No. 23164657. 1, dated Nov. 9, 2023, with machine English translation, 8 pages.
(Continued)

*Primary Examiner* — Alison L Hindenlang
*Assistant Examiner* — Shibin Liang
(74) *Attorney, Agent, or Firm* — HAYES SOLOWAY P.C.

(57) ABSTRACT

An apparatus for forming plastic preforms into plastic containers has a rotatable transport carrier on which a plurality of forming stations is arranged. The forming stations each have blow molding devices within which the plastic preforms are formed by application of a flowable medium into the plastic containers. The apparatus has a clean room, within which the plastic preforms are expanded into the plastic containers, a feed device to feed plastic preforms to be formed, and a discharge device for discharging formed containers from the transport device. The apparatus also has an ejection device for ejecting plastic preforms or plastic containers from the transport path, being arranged between the discharge device and the feed device.

15 Claims, 3 Drawing Sheets

(51) Int. Cl.
　　B29C 49/46　　　　(2006.01)
　　*B29C 49/70*　　　　(2006.01)
　　*B29L 31/00*　　　　(2006.01)

(52) U.S. Cl.
　　CPC ................. *B29C 2049/4697* (2013.01); *B29C 2049/701* (2013.01); *B29L 2031/7158* (2013.01)

(56)　　　　　　　References Cited

U.S. PATENT DOCUMENTS

| | | | |
|---|---|---|---|
| 2018/0250869 A1 | 9/2018 | Hack et al. | ............. B29C 49/46 |
| 2020/0198215 A1* | 6/2020 | Mueller | ................. B29C 49/12 |

FOREIGN PATENT DOCUMENTS

| | | | |
|---|---|---|---|
| DE | 102017120106 | 2/2019 | ............. B29C 49/42 |
| DE | 102017124331 | 4/2019 | ............. B26C 49/46 |
| DE | 202019102193 | 10/2020 | ............. B07C 5/38 |
| WO | 2006/097243 | 9/2006 | ............. A61L 2/20 |

OTHER PUBLICATIONS

Search Report issued in German Patent Appln. Serial No. 10 2022 117 359.3, dated Jul. 12, 2022, with machine English translation, 8 pages.

\* cited by examiner

STERILE BLOW MOLDING MACHINE WITH EJECTION SLUICE AND METHOD FOR THE OPERATION THEREOF

BACKGROUND OF THE INVENTION

The present invention relates to an apparatus and a method for forming plastic preform into plastic containers. Such apparatuses and methods have long been known in the art. Usually, heated plastic preforms are expanded by a gas, in particular compressed air.

More recently, there has been an effort to also enable the production of such containers in a sterile manner. This is advantageous for bottling certain beverages. In the prior art, the containers were originally first manufactured, for example stretch blow molded, and then sterilized. In recent times, systems have also become known in which the preforms are already sterilized and then formed in a clean room, for example, stretch blow molded.

Problems may arise if, for example, containers have been damaged or get damaged during the blow molding process. Such damaged containers can cause problems in the system after the production or after the production is attempted. For this reason, it is known per se to eject containers out of the transport path of the containers.

In the case of a sterile blow molding process, however, such an ejection is associated with problems, because care must be taken that the sterility of the blow molding process is not disturbed or interrupted.

The object of the present invention is therefore to improve the operating sequences of such sterile blow molding machines.

SUMMARY OF THE INVENTION

An apparatus according to the invention for forming plastic preforms into plastic containers has a transport device which transports the plastic preforms to be formed along a predetermined transport path. The transport device has a rotatable transport carrier on which a plurality of forming stations is arranged, said forming stations each having blow molding devices within which the plastic preforms can be formed by application of a flowable and in particular gaseous medium into the plastic containers and the forming stations each having application devices in order to apply the flowable and in particular gaseous medium to the plastic preforms.

Furthermore, the apparatus has a clean room within which the plastic preforms are expanded and/or can be expanded into the plastic containers. According to the invention, the device has an ejection device to eject plastic preforms or plastic containers from the transport path, wherein this ejection device is at least partially and particularly preferably completely integrated into the clean room and/or the ejection device is integrated into at least one wall delimiting the clean room.

In this case, integrated is understood to mean that in particular at least one element of the ejection device is located within the clean room or at the clean room boundary and/or the ejection device also delimits this clean room.

The present invention is further directed to an apparatus for forming plastic preforms into plastic containers, with a transport device which transports the plastic preforms to be formed along a predetermined transport path, the transport device having a rotatable transport carrier on which a plurality of forming stations is arranged, said forming stations each having blow molding devices within which the plastic preforms are able to be formed by application of a flowable medium into the plastic containers, and the forming stations each applying the flowable medium to the plastic preforms.

Furthermore, the apparatus has a clean room within which the plastic preforms are expanded and/or can be expanded into the plastic containers. Furthermore, the apparatus has a feed device to supply plastic preforms to be formed to the transport device, as well as a discharge device for discharging formed containers from the transport device.

According to the invention, the apparatus has an ejection device for ejecting plastic preforms or plastic containers from the transport path, said ejection device being arranged in a region of the discharge device and/or between the discharge device and the feed device and/or in a region of the feed device and/or the ejection device being arranged in a region in which the blow molding devices are at least partially and preferably completely open during working operation.

Preferably, therefore, the aforementioned region between the discharge device and the feed device also includes the respective transfer regions, that is to say in particular the region in which containers (properly) manufactured in a working operation are transferred from the transport carrier and/or the forming stations to the discharge device and/or in particular the region in which plastic preforms are transferred from the feed device to the transport carrier and/or the forming stations during a working operation.

The apparatus is preferably designed in such a way that the ejection device is arranged in a region in which plastic containers manufactured in a working operation are transferred from the transport carrier and/or the forming stations to the discharge device.

It is pointed out that the two embodiments described here may also be combined with one another, i.e., the ejection device is both integrated in the clean room as well as arranged between the discharge device and the feed device.

An arrangement between the discharge device of the feed device is understood in particular to mean that the ejection device is arranged along the transport path between the discharge device and the feed device. In particular, in a working operation, it is a region in which already (properly) manufactured containers have been discharged or are being discharged but no new containers or plastic preforms are being introduced into the blow molding devices.

Particularly preferably, the rotational movement of the transport carrier is an angular range that is greater than 5°, prefer ably greater than 10°, preferably greater than 20°. Preferably, this is an angular range that is less than 100°, preferably less than 90°, preferably less than 80°, preferably less than 70° and preferably less than 60°.

The ejection device preferably forms a clean room boundary. The ejection device preferably also forms an ejection device or has such an ejection device by means of which plastic preforms and/or plastic containers are transported across a clean room boundary.

The arrangement of the ejection device within the clean room boundary and/or the arrangement within the clean room can ensure that a sterile working operation of the apparatus is not disturbed despite a functioning of this ejection device.

In a preferred embodiment, the apparatus has at least one movable or rotating or rotatable part, in particular the aforementioned transport device or the transport carrier and also a stopped or stationary part. The ejection device is preferably arranged in a stationary manner and/or in a stationary part of the apparatus.

The ejection device is preferably suitable and intended for the purpose of discarding containers, in particular plastic preforms as well as blown containers in a running operation. In particular, the ejection device is suitable and intended for determining defective plastic preforms or plastic containers.

In a further preferred embodiment, the clean room has a toroidal and/or annular shape. Particularly preferably, at least one wall is provided which delimits the clean room. Particularly preferably, at least two walls are provided, a wall and in particular a wall delimiting the clean room being movable relative to the other wall delimiting the clean room.

In the case of a further advantageous embodiment, the apparatus has a sealing device in order to seal the clean room off from a non-sterile environment, and preferably the sealing device has at least one circumferential channel which can be filled with a liquid. In this preferred embodiment, a so-called water lock is proposed in order to seal the clean room off from the non-sterile environment.

Particularly preferably, the sealing device has a peripheral wall which projects into this circumferential channel, wherein the wall is preferably designed to be rotatable. Particularly preferably, the rotational movement of this wall is coupled to the rotational movement of the transport carrier. This circumferential wall preferably forms a clean room boundary of the clean room.

In a further preferred embodiment, the forming stations each have stretching devices for stretching the plastic preforms in their longitudinal direction, and these stretching devices preferably each have a stretching rod movable in the longitudinal direction of the plastic preforms, which stretching rod can be introduced into the plastic preforms.

In the case of a further advantageous embodiment, the ejection device is suitable and intended for ejecting plastic preforms or plastic containers from the clean room. In this case, it is preferably possible for the containers or plastic preforms to be first removed from the transport path within the clean room and thus for example to come to rest in a specific region of the clean room and then be ejected by the ejection device from the clean room and/or through the sterile room boundary.

In a further preferred embodiment, the apparatus has filter devices and in particular air filter devices which filter the air supplied to the plastic preforms. Preferably, these are so-called HEPA filters.

Particularly preferably, the feed and discharge devices each have transport stars or transport wheels in order to supply plastic preforms or to discharge plastic containers. In this case, it is possible for a further ejection device to be provided, via which or through which the plastic preforms are fed to the clean room and/or the transport carrier and/or an ejection device is provided by which (properly formed) plastic containers are removed from the clean room and/or from the transport carrier or the individual forming stations (in normal working operation).

However, the feed device preferably also transports the plastic preforms within a clean room and/or under clean room conditions. Particularly preferably, the containers are also transported further within a clean room and, in particular, the discharge device or parts thereof are also located within the or a clean room.

Particularly preferably, the ejection device allows ejection during production, in particular without the apparatus then having to be re-sterilized after the ejection.

Particularly preferably, the apparatus allows at least two independent operating modes or can be operated in at least two independent operating modes, namely on the one hand a working operation in which plastic preforms are formed into plastic containers and on the other hand a sterilization operation in which the apparatus is sterilized.

Particularly preferably, the ejection device is suitable and intended to eject both plastic preforms and plastic containers, as well as intermediate products produced during the forming process, from the clean room.

As mentioned above, the apparatus particularly preferably has a feed device to supply plastic preforms to be formed to the transport device, as well as a discharge device for discharging formed containers from the transport device and the ejection device is preferably arranged between the discharge device and the feed device. It is also possible for the ejection device to be arranged geometrically between the discharge device and the feed device, or for components of the ejection device to be arranged geometrically between the discharge device and the feed device.

The arrangement of the ejection device in this angular range furthermore offers the advantage that, in this region, the blow molds are usually opened in a working mode because they have just been removed and no new plastic preform have been introduced. This region is therefore particularly suitable for removing plastic preforms and/or plastic containers from the transport path.

In the case of a further advantageous embodiment, the ejection device is arranged below the transport path of the plastic preforms. In this way, a simple ejection process is possible, because the effect of gravity can be utilized to transport the plastic preforms or plastic containers to the ejection device. The containers can thus fall out of or fall from the transport path in order to reach the ejection device.

The ejection device preferably has an opening which sweeps over an angular range of at least 5°, preferably at least 10°, preferably at least 12° and preferably at least 15° and preferably at least 20°. Particularly preferably, this opening provided by or achievable by the ejection device is dimensioned such that plastic preforms as well as plastic containers can fall through this opening.

This ejection device is preferably designed in such a way that the clean room does not have to be re-sterilized once the plastic preforms or plastic containers have been ejected.

The ejection device preferably has a sealing device and in particular at least one sealing flap which seals the aforementioned opening in a working operation of the system. Preferably, this sealing flap can be opened towards the outside and/or downward with respect to the clean room.

In a preferred embodiment, the apparatus has a suction device for suctioning off a flowable medium from the clean room, wherein this suction device is arranged in particular in a region of the ejection device. Particularly preferably, this suction device is also arranged between an outlet or between the discharge device and, on the other hand, the inlet, i.e., the aforementioned discharge device, via which the plastic preforms are guided to the apparatus.

Particularly preferably, the suction device is located between the clean room and a receiving device, which is described in more detail below and serves to receive ejected plastic preforms or plastic containers. Particularly preferably, a clean room boundary is also located in this region, because an overpressure preferably prevails in a region above the suction, i.e., the clean room. The suction preferably prevents germs or impurities from entering the clean room.

In a preferred embodiment, the suction device is arranged below the clean room (i.e., closer to the earth's center). A clean room boundary is preferably arranged above the suction device.

As mentioned, the apparatus particularly preferably has a receiving space which serves for receiving the ejected plastic preforms or plastic containers or intermediate products. Particularly preferably, this receiving space is arranged outside the clean room. Particularly preferably, this receiving space is located below the clean room and in particular below the ejection device.

Particularly preferably, the ejection device establishes a connection between the clean room and the receiving space. Particularly preferably, this receiving space can be closed off completely. Particularly preferably, however, this receiving space also has a door or the like, in particular to be able to ultimately remove ejected containers or plastic preforms from the clean room.

In a further preferred embodiment, the receiving space can be connected to the clean room and/or the ejection device via an interface.

The above-described suction device preferably has a pump device in order to actively enable a suctioning of a gaseous medium from the clean room.
Particularly preferably, the suction device has at least one tube (at least partially) arranged in the interior of the clean room. This tube is preferably oriented vertically. Particularly preferably, at least two such tubes are provided. These can in particular be arranged laterally next to the ejection device. These tubes particularly preferably terminate and/or begin within the clean room. Particularly preferably, the suction device is arranged at least partially below the clean room. Particularly preferably, a clean room boundary is thus located above this suction device.

Particularly preferably, the suction device is designed such that within the clean room the flowable medium is caused to flow in the direction of the ejection device. In this way, a flow is particularly preferably produced vertically downwards. In a working mode, the clean room is particularly preferably exposed to an overpressure with respect to the surroundings. In this way, it can be achieved that gaseous medium cannot get into the clean room.

Preferably, suction from a lower part of the apparatus, in particular a region below the ejection sluice, is not necessary, because this region is not part of the sterile region. The ejection device preferably has ejection sluice doors which, however, can particularly preferably only be opened when further sealing devices, as described in more detail below, are folded upward or sealed.

In this way, however, these further flaps do not form a clean room boundary, but only serve to maintain an overpressure in the clean room when the door of the receiving space is opened. In this case, a clean room boundary is preferably just above a further sealing device (as explained in more detail below) because an overpressure prevails in this upper region relative to the lower region, for example the receiving space for receiving the ejected containers.

This ensures that no germs get into the clean room. As mentioned above, a distinction can be made between a sterilization mode and a production mode. In a sterilization mode, in which no containers are produced, the interior of the clean room is sterilized. For example, H2O2 can be introduced. In production mode, in which containers are produced, preferably no hydrogen peroxide or another sterilization agent is introduced into the clean room.

The blowing of the containers is preferably carried out with filtered air and in particular with HEPA-filtered air. In sterilization mode, the ejection sluice door cannot be opened because, otherwise, hydrogen peroxide would reach the outside. The door can only be opened in production mode, because no hydrogen peroxide or another sterilization agent can get out of the clean room during production. However, it is preferably ensured in this case that no contamination of the clean room occurs. This is preferably achieved by an overpressure prevailing in the upper region of the clean room or generally in the clean room.

As mentioned above, the receiving space for receiving ejected plastic preforms or plastic containers can particularly preferably be connected to the ejection device. As mentioned above, for example, a further sealing device, such as a door or the, like can be provided for this purpose.

In normal operation of the apparatus, said receiving space is preferably separated from the clean room. Said door can be temporarily opened in order to convey plastic preforms or containers which have already ejected from the clean room and/or the transport path into the receiving space. It is possible in this case for ejected synthetic waste preforms or plastic containers to remain in the clean room for a certain time after their ejection from the transport path, for example in the region of the ejection device, to then be ejected from the clean room and preferably into the receiving space.

In a preferred embodiment, the apparatus has a state detection device which is suitable and intended for detecting a faulty forming process and/or a defectively formed container. Such a container can subsequently be separated out. Particularly preferably, such a state detection device can be assigned to each forming station.

Thus, for example, during the expansion process it can be determined that a pressure drop or the like occurs, which indicates a burst container. In addition, a visual inspection of the containers or plastic preforms would also be possible, by which an ejection process can then be initiated.

For example, it can be determined that a certain plastic preforms is defective already at the beginning of the blowing process. In this case, a forming of this plastic preforms can be dispensed with, for example, and it can just be transported. The plastic preform can then be ejected.

Particularly preferably, the apparatus also has an assignment device which assigns a specific forming station to a specific plastic preform or plastic container, said forming station possibly causing a fault. In this way, it can be determined that a specific forming station is producing defective plastic containers, and this forming station can be switched off, as appropriate, for a certain period of time.

In the case of a further advantageous embodiment, the apparatus has a control device which, at least in part, enables the plastic preforms or plastic containers to be transported with the transport device between the discharge device and the feed device and/or in an open state of the blow molding device.

As mentioned above, no containers are transported between the discharge device and the feed device in a normal working mode, because already manufactured containers have been dispensed in this region and no new plastic preforms have been supplied. This means that there would typically be no intact containers in this region. However, when a fault is detected, a control device can cause the corresponding non-intact or defective container to be transported into this region in order to eject it.

Particularly preferably, the transport device has holding devices and in particular controlled holding devices for holding the plastic preforms or containers. A control device can then cause the holding device to eject the containers in said region between the discharge device and the feed device.

Particularly preferably, the apparatus has a guiding device in order to open and close the blow molding devices. Particularly preferably, the plastic preforms or containers are dropped when a blow molding device is opened. In addition, however, an ejection directly on the feed device or the discharge device is also conceivable, for example by means of a so-called pusher.

In a preferred embodiment, the ejection device is integrated into the clean room as mentioned above and/or the ejection device is integrated into at least one wall that delimits the clean room.

In a further advantageous embodiment, the ejection device allows containers to be ejected from the transport path (but not necessarily from the clean room) during ongoing production.

The present invention is further directed to a method for forming plastic preforms into plastic containers, wherein a transport device transports the plastic preforms to be formed (in particular in a working operation) along a predetermined transport path, and wherein the transport device has a rotatable transport carrier on which a plurality of forming stations is arranged, said forming stations each having blow molding devices, within which the plastic preforms are formed by applying a flowable medium to the plastic containers, and the forming stations each having application devices which apply a flowable, and in particular gaseous, medium to the plastic preforms, the apparatus further comprising a clean room within which the plastic preforms are expanded into the plastic containers.

According to the invention, plastic preforms or plastic containers are ejected from the apparatus and in particular from the clean room by means of an ejection device, wherein the ejection device is integrated into the clean room and/or the ejection device has been or is integrated into at least one wall delimiting the clean room.

In a further method according to the invention for forming plastic preforms into plastic containers, a transport device transports the plastic preforms to be formed along a predetermined transport path, wherein the transport device has a rotatable transport carrier on which a plurality of forming stations is arranged and wherein these forming stations each have blow molding devices within which the plastic preforms are formed by application of a flowable medium into the plastic containers, and the forming stations each have application devices which apply the flowable medium to the plastic preforms, wherein the apparatus has a clean room, within which the plastic preforms are expanded with the flowable medium, wherein the plastic preforms are fed to the transport device by means of a feed device and the formed plastic pre-containers are discharged from the transport device by means of a discharge device.

According to the invention, plastic preforms or plastic containers are ejected by means of an ejection device from the apparatus and in particular from the clean room, wherein the ejection takes place in a transport direction of the plastic preforms in a region of the discharge device and/or between the discharge device and the feed device.

An ejection between the discharge device and the feed device is also understood to mean ejecting directly at the discharge app device apparatus or directly at the feed device, i.e., in those portions in which the containers are transferred from the forming station to the discharge device or in which plastic preforms are transferred from the feed device to the forming stations.

Preferably, ejection takes place in a region in which the blow molding device have been opened or are opened during working operation.

Particularly preferably, the plastic preforms are ejected in a running transport path.

In a further preferred method, plastic preforms or plastic containers are ejected from the clean room.

Further advantages and embodiments can be seen in the accompanying drawings:

DETAILED DESCRIPTION OF THE INVENTION

Figure 1:
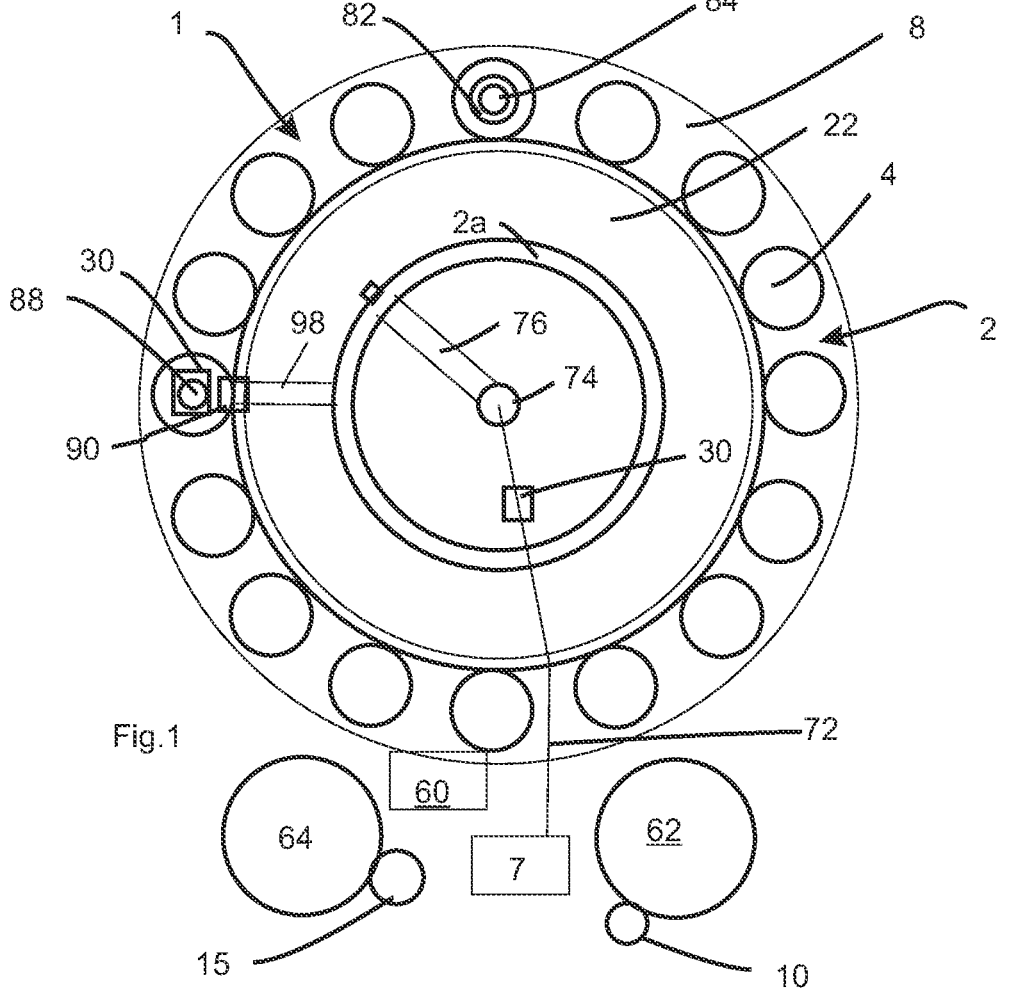
FIG. 1 shows a schematic representation of an apparatus according to the invention.

FIG. 1 shows a apparatus 1 for forming plastic preforms 10 into plastic containers 15. This apparatus has a rotatable carrier 22 on which a plurality of forming stations 4 is arranged. These individual forming stations each have blow molds or blow molding devices 82, which form a cavity in their interior for expanding the plastic preforms.

Reference numeral 84 designates an application device which serves for expanding the plastic preforms 10. This may be, for example, a blowing nozzle, which can be placed on an opening of the plastic preforms in order to expand them. The reference numeral 90 designates a valve arrangement, such as a valve block, which preferably has a plurality of valves which control the application of different pressure levels to the plastic preforms.

In a preferred method, the plastic preforms are initially loaded with a pre-blowing pressure P1, then with at least one intermediate blowing pressure Pi, which is higher than the pre-blowing pressure, and finally with a finishing blow molding pressure P2, which is higher than the intermediate blowing pressure Pi. After the expansion of the plastic containers, the pressures or the compressed air are preferably returned from the container to the individual pressure reservoirs.

Reference numeral 88 designates a stretching rod which serves to stretch the plastic preforms in their longitudinal direction. Preferably, all forming stations have such blow molds 82 and stretching rods 88. The number of these forming stations is preferably between 2 and 100, preferably between 4 and 60, preferably between 6 and 40.

The plastic preforms 10 are fed via a first transport device 62, such as, in particular, but not exclusively, to a transport star of the apparatus. The plastic containers 15 are transported away via a second transport device 64. Thus, the transport device 62 is the aforementioned feed device and the transport device 64 is the aforementioned discharge device.

The reference sign 7 designates a pressure supply device, such as a compressor or a compressed air connection. The compressed air is conveyed via a connecting line 72 to a rotary distributor 74 and is indicated thereby via a further line 76 to the reservoir 2a, which is preferably an annular channel in this case.

However, in addition to this shown annular channel 2a, further annular channels are preferably provided which, in the illustration shown in FIG. 1, are covered by the annular channel 2a, for example they are below it. The reference number 98 designates a connecting line which delivers the compressed air to a forming station 4 or the valve block 90 thereof. Preferably, each of the annular channels is connected to all forming stations via corresponding connecting lines.

The reference number 8 schematically designates a clean room, which in this case is preferably designed in the shape of a ring and surrounds the transport path of the plastic preforms 10. Preferably, a (geometric) axis of rotation, with respect to which the transport carrier is rotatable, is arranged outside the clean room 8. Preferably, the clean room is sealed off from the non-sterile environment with a sealing device, which preferably has at least two water locks.

The reference numeral 60 designates roughly schematically an ejection device. As mentioned above, this is arranged between the discharge device 64 and the feed device 62.

Figure 2:
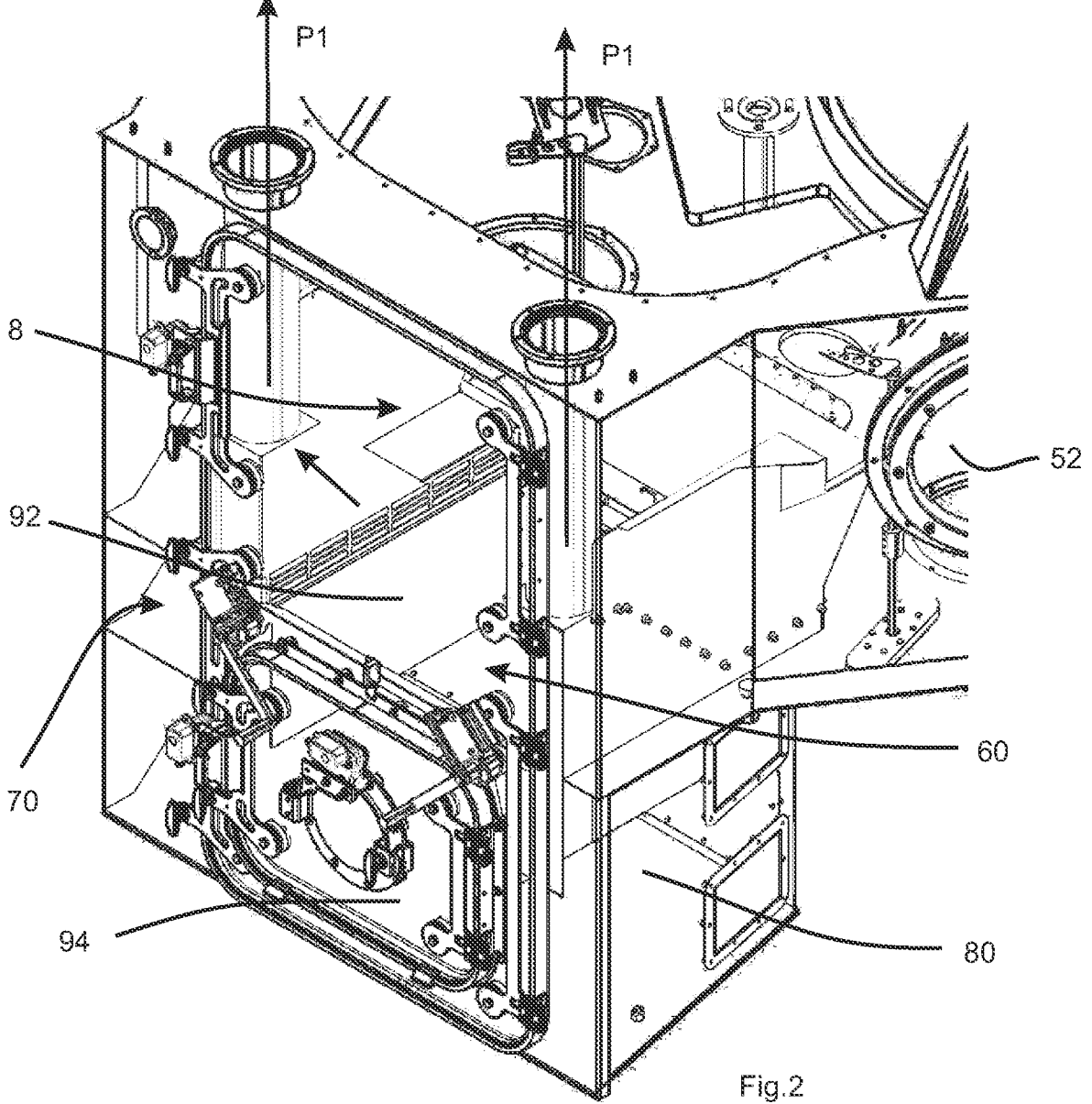
FIG. 2 shows a detail view of an apparatus according to the invention.

FIG. 2 shows a partial view of an apparatus according to the invention. The clean room 8 can be seen here within which the plastic preforms are formed into the plastic containers. The reference numeral 60 designates in its entirety an ejection device which serves to eject containers (not shown) from the clean room.

This ejection device in this case has a flap arrangement 92 which is shown here in an open state, i.e., in a state in which plastic preforms or plastic containers can be guided out of the clean room into a receiving space 80 (under the action of gravity).

In a closed state of the flap 92, the clean room 8 is delimited from the receiving space 80.

The reference number 94 designates a sealing device and in particular a door by means of which the receiving space 80 can be opened in order to ultimately remove ejected plastic preforms or plastic containers.

Particularly preferably, a locking mechanism is provided which prevents opening of the door 94 when the flap of the ejection device 92 is in the state shown in FIG. 2, i.e., in an open state. In this way, it is possible to prevent the door 94 from being opened, whereby the clean room could be contaminated, as long as a flow connection exists between the clean room 8 and the receiving space 80.

In general, a clean room is understood to mean a room within which there is a higher degree of purity than in a sterile environment. In particular, considerably fewer germs or impurities are present in a clean room than outside the clean room.

The reference number 52 designates a further ejection device via which plastic preforms can be supplied here to the clean room.

The reference number 70 designates a suction device which serves for aspirating a gaseous medium. This suction is carried out via two tubes, as illustrated by the arrows P1.

A suctioning out of the lower part (below the flaps 92) is not necessary, because this region is not a part of the sterile region or clean room. As already shown, the ejection sluice doors 94 can only be opened as soon as the flaps 92 are folded upward. However, the flaps 92 do not form a mechanical clean room boundary, but rather serve preferably only for an overpressure in the clean room to be maintained when the doors 94 are open. The clean room border is just above the flap 92, because an overpressure prevails in the upper region relative to the lower region. This ensures that no germs reach the clean room 8.

Figure 3:
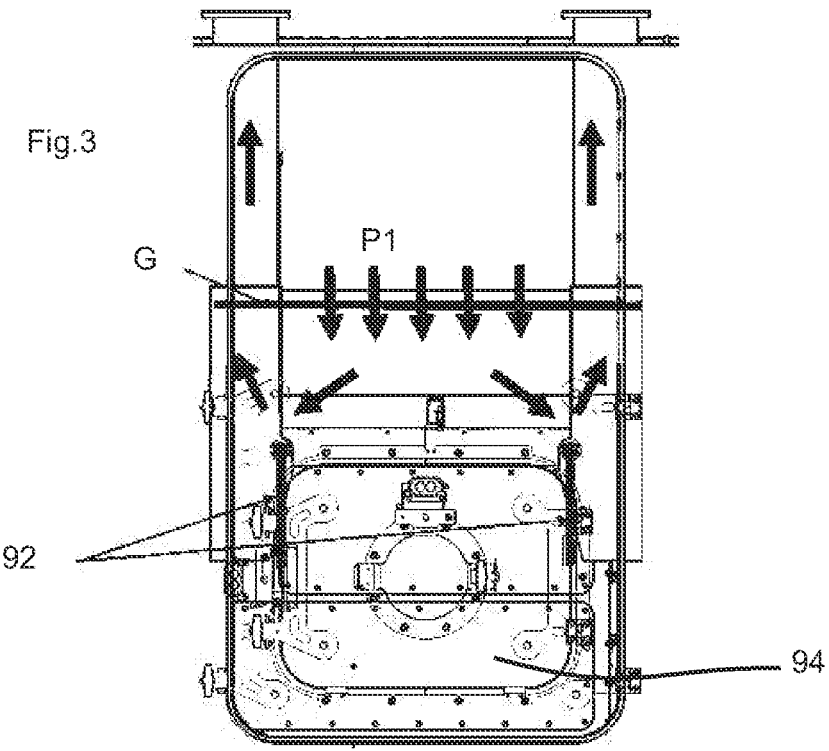
FIG. 3 shows an illustration for suction out of the clean space.
Figure 4:
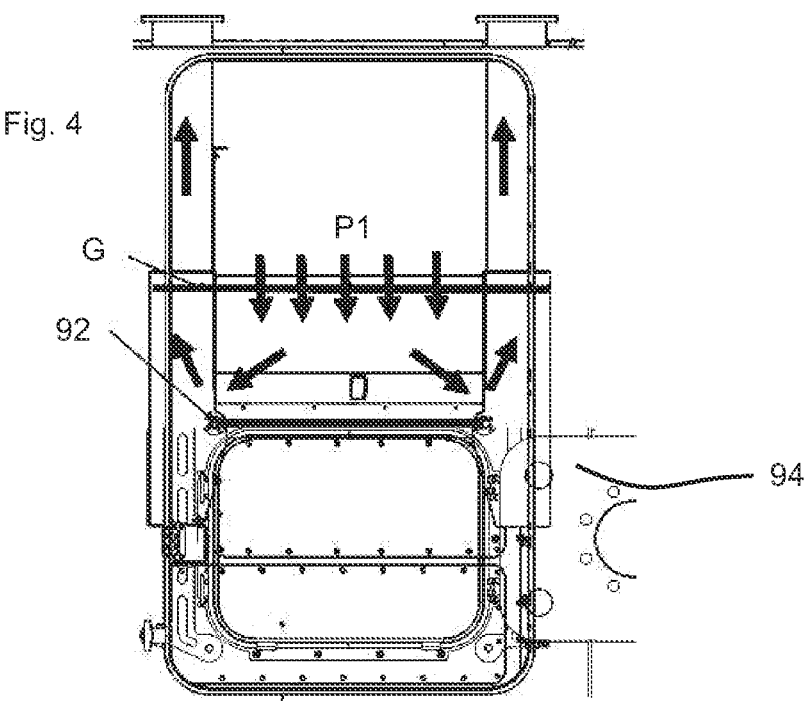
FIG. 4 shows a further illustration for suction out of the clean room.

FIGS. 3 and 4 illustrate the function of this suction.

In the situation shown in FIG. 3, the flaps 92 are open. The suction takes place here along the arrows P1. The reference sign G thus designates a clean room boundary which, however, extends above the flaps 92.

FIG. 4 shows a situation in which the flaps 92 are closed. Here too, the clean room boundary runs above the closed caps 92. In this situation, the door 94 can also be opened, in particular in order to remove containers from the receiving space.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. An apparatus for forming plastic preforms into plastic containers with a transport device which transports the plastic preforms to be formed along a predetermined transport path, the transport device having a rotatable transport carrier on which a plurality of forming stations is arranged, said forming stations each having blow molding devices within which the plastic preforms are formed by application of a flowable medium into the plastic containers, and the forming stations each having application devices configured to apply the flowable medium to the plastic preforms, and the apparatus having a clean room, within which the plastic preforms are expanded into the plastic containers, and the apparatus having a feed device configured to feed the plastic preform to the transport device and a discharge device configured to discharge formed containers from the transport device, wherein the apparatus has an ejection device configured for ejecting plastic preforms or plastic containers from the transport path, said ejection device being arranged in a region between the discharge device and the feed device, wherein the apparatus has a suction device configured for suctioning off a flowable medium from the clean room, said suction device being arranged in a region of the ejection device, and wherein the suction device is configured to cause a flow of the flowable medium in the direction of the ejection device within the clean room, and wherein the apparatus has a receiving space for receiving ejected plastic preforms or plastic containers, wherein the suction device is located between the clean room and the receiving space.

2. The apparatus according to claim 1, wherein the apparatus has a sealing device configured to seal the clean room off from an unsterile environment, and this sealing device has at least one circumferential channel that can be filled with a liquid.

3. The apparatus according to claim 1, wherein the ejection device is configured for discharging plastic preforms or plastic containers from the clean room.

4. The apparatus according to claim 3, wherein the apparatus has a control device configured to control transport the plastic preforms or plastic containers with the transport device between the discharge device and the feed device and/or in an open state of the blow molding device.

5. The apparatus according to claim 4, wherein the ejection device is integrated into the clean room and/or in that the ejection device is integrated into at least one wall delimiting the clean room.

6. The apparatus according to claim 1, wherein the ejection device is arranged below the transport path of the plastic preforms or plastic containers.

7. The apparatus according to claim 1, wherein the suction device has at least one tube arranged in the interior of the clean room.

8. The apparatus according to claim 7, characterized in that this tube is oriented vertically.

9. The apparatus according to claim 7, characterized in that wherein at least two such tubes are provided.

10. The apparatus according to claim 9, characterized in that these tubes are arranged laterally next to the ejection device.

11. The apparatus according to claim 9, characterized in that these tubes terminate and/or begin within the clean room.

12. The apparatus according to claim 1, wherein the receiving space is connected to the ejection device by an interface.

13. The apparatus according to claim 1, wherein the apparatus has a state detection device which is configured for detecting a faulty forming process and/or an incorrectly formed container.

14. The apparatus according to claim 1, characterized in that the ejection device has ejection sluice doors which, can only be opened when further sealing devices are folded upward or sealed.

15. A method for forming plastic preforms into plastic containers with an apparatus for forming plastic preforms into plastic container, wherein a transport device transporting the plastic preforms to be formed along a predetermined transport path, the transport device has a rotatable transport carrier on which a plurality of forming stations is arranged, said forming stations each having blow molding device within which the plastic preforms are formed by application thereto of a flowable medium into the plastic containers, and the forming stations each having application devices configured to apply the flowable medium to the plastic preforms, and the apparatus having a clean room, within which the plastic preforms are expanded into the plastic containers, the plastic preforms being fed to the transport device by a feed device, and the formed plastic containers being discharged from the transport device by a discharge device, wherein plastic preforms or plastic containers are ejected at times from the apparatus by an ejection device, the ejection taking place in a transport direction of the plastic preforms in a region between the discharge device and the feed device, wherein the apparatus has a suction device configured for suctioning off a flowable medium from the clean room, said suction device being arranged in a region of the ejection device, and wherein the suction device is configured to cause a flow of the flowable medium in the direction of the ejection device within the clean room, and wherein the apparatus has a receiving space for receiving ejected plastic preforms or plastic containers, wherein the suction device is located between the clean room and the receiving space.

\* \* \* \* \*